United States Patent [19]

Kondo

[11] Patent Number: 5,150,695
[45] Date of Patent: Sep. 29, 1992

[54] ELECTRONIC CONTROL APPARATUS FOR AN INTERNAL COMBUSTION ENGINE

[75] Inventor: Katsuhiko Kondo, Himeji, Japan
[73] Assignee: Mitsubishi Denki K.K., Tokyo, Japan
[21] Appl. No.: 681,818
[22] Filed: Apr. 8, 1991

[30] Foreign Application Priority Data

May 22, 1990 [JP] Japan ................ 2-133060

[51] Int. Cl.⁵ ............................................. F02M 25/07
[52] U.S. Cl. ........................................................ 123/571
[58] Field of Search ........................ 123/568, 569, 571

[56] References Cited

U.S. PATENT DOCUMENTS

| | | | |
|---|---|---|---|
| 4,640,257 | 2/1987 | Kodama et al. | 123/571 |
| 4,671,107 | 6/1987 | Chiesa et al. | 123/571 |
| 4,715,348 | 12/1987 | Kobayashi et al. | 123/571 |
| 4,825,841 | 5/1989 | Norota et al. | 123/571 |

FOREIGN PATENT DOCUMENTS

60-52298 11/1985 Japan .

Primary Examiner—Willis R. Wolfe
Attorney, Agent, or Firm—Sughrue, Mion, Zinn, Macpeak & Seas

[57] ABSTRACT

An electronic control apparatus for an internal combustion engine which comprises a control device for exhaust gas return having a control valve for exhaust gas return so that a part of exhaust gas returns from an exhaust gas passage to a suction gas passage, a pressure sensor for detecting pressure in a suction gas pipe, and a failure detecting means for detecting failure of said control device for exhaust gas return based on a value of pressure in said suction gas pipe when said control value for exhaust gas return is in operation, and a second value of pressure in the exhaust gas pipe when the control valve of exhaust gas return is not in operation.

3 Claims, 2 Drawing Sheets

ELECTRONIC CONTROL APPARATUS FOR AN INTERNAL COMBUSTION ENGINE

BACKGROUND OF THE INVENTION

1. Field of the Invention

This invention relates to an electronic control apparatus for an internal combustion engine capable of determining failure in a control device for exhaust gas return which controls a return quantity of exhaust gas.

2. Discussion of Background

A conventional electronic control apparatus for an internal combustion engine of this kind is to be explained in FIG. 1.

In FIG. 1, numeral 1 signifies a conventional four cycle spark ignition type engine mounted on an automobile. The engine 1 sucks air for combustion through the air cleaner 2, the suction pipe 3 and the throttle valve 4. Fuel is supplied to the engine 1 by the electromagnetic valve 5 installed at the suction pipe 3 from a fuel system, not shown. At the downstream side of the throttle valve 4 of the suction pipe 3, there is a pressure sensor 6 for detecting an absolute pressure in the suction pipe 3 and converting it to an electric voltage. The throttle sensor 7 detects the opening of the throttle valve 4, and generates an electric voltage corresponding thereto. The electronic engine control device 8 receives the outputs of the pressure sensor 6, a crank angle sensor (not shown), the throttle sensor 7, a cooling water temperature sensor (not shown), and so on, and controls the drive of the electromagnetic injection valve 5, an air control valve 17 and an electromagnetic valve 9.

A part of the exhaust gas separated to the exhaust gas branch pipe 11, which is connected to the exhaust gas pipe 10, returns to the engine 1 by flowing into the downstream side of the throttle valve 4 of the suction pipe 3 via an exhaust gas return, hereafter EGR, control valve 12 which controls the return of the exhaust gas, and the EGR intake pipe 13. The EGR control valve 12 is composed of a well known structure, the constituent parts of which are negative pressure chamber 12A, valve 12B and spring 12C of the negative pressure chamber 12A. The negative pressure chamber 12A is connected to the negative pressure control pipe 14 which is connected in the neighborhood of the downstream side of the throttle valve 4 of the suction pipe 3 via the electromagnetic valve 9. The EGR quantity is controlled by a negative pressure working on the negative pressure chamber 12A through the valve 12B and the EGR intake pipe 13.

Next, the operation of the above device is explained. The electronic engine control device 8 receives the input signals from the pressure sensor 6, a crank angle sensor (not shown), and a cooling water temperature sensor (not shown), and so on, to purify the exhaust gas, especially NO$_x$, to an optimum condition, and controls the electromagnetic valve 9 by determining the operation or the non-operation of the EGR control valve 12, so that no bad influence is put on the driving condition of the engine 1. First, this electronic engine control device 8 generates a control signal whereby the electromagnetic valve 9 is closed, when the EGR control valve 12 is operated. In this case, the negative pressure chamber 12A and the negative pressure control pipe 14 are connected whereby the valve 12B is in fully open state by the negative pressure at the downstream side of the throttle valve 4. As a result, the EGR is in operation.

The EGR control valve 12 does not operate, when a control signal is outputted whereby the electromagnetic valve 9 is open. In this case the negative pressure chamber 12A is open to the air via pipe 16, which fully closes the valve 12B. Accordingly, exhaust gas is not returned and the EGR is not in operation. The above-mentioned conventional electronic control device for an internal combustion engine has a problem because fault detection of the EGR control system is not possible in the case of failure, malfunction of the EGR control system or clogging of valves and pipes by dirts. As the result, return to the engine of the exhaust gas of a predetermined quantity and deterioration of the exhaust gas, can not be detected.

SUMMARY OF THE INVENTION

It is an object of the present invention to provide an electronic control apparatus for an internal combustion engine capable of detecting failures in the EGR control system.

According to the present invention, there is provided an electronic control apparatus for an internal combustion engine which comprises a control device for exhaust gas return having a control valve for exhaust gas return so that a part of exhaust gas returns from an exhaust gas passage to a suction gas passage, a pressure sensor for detecting pressure in a suction gas pipe, and a failure detecting means for detecting failure of said control device for exhaust gas return based on a value of pressure in said suction gas pipe when said control valve for exhaust gas return is in operation, and a second value of pressure in the exhaust gas pipe when the control valve of exhaust gas return is not in operation.

The above failure detecting means may detect the failure when the internal combustion engine is under a load below a predetermined value and running in steady state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
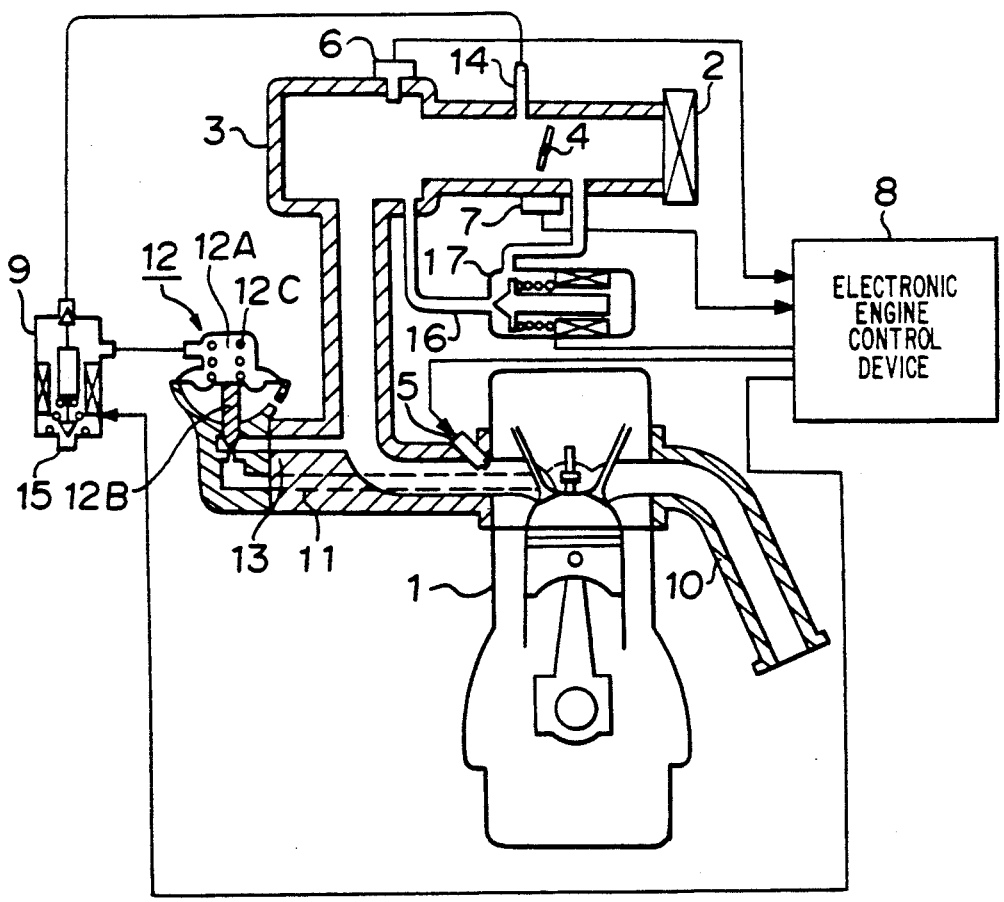
FIG. 1 is a block diagram showing an embodiment of the electronic control apparatus for an internal combustion engine according to the present invention.

Referring to the drawings, explanation will be given on the present invention.

FIG. 1 is a block diagram showing an electronic control apparatus for an internal combustion engine of the present invention. The structure and the general operation of this block diagram was already explained. Therefore, explanation will not be given to these matters.

Figure 2:
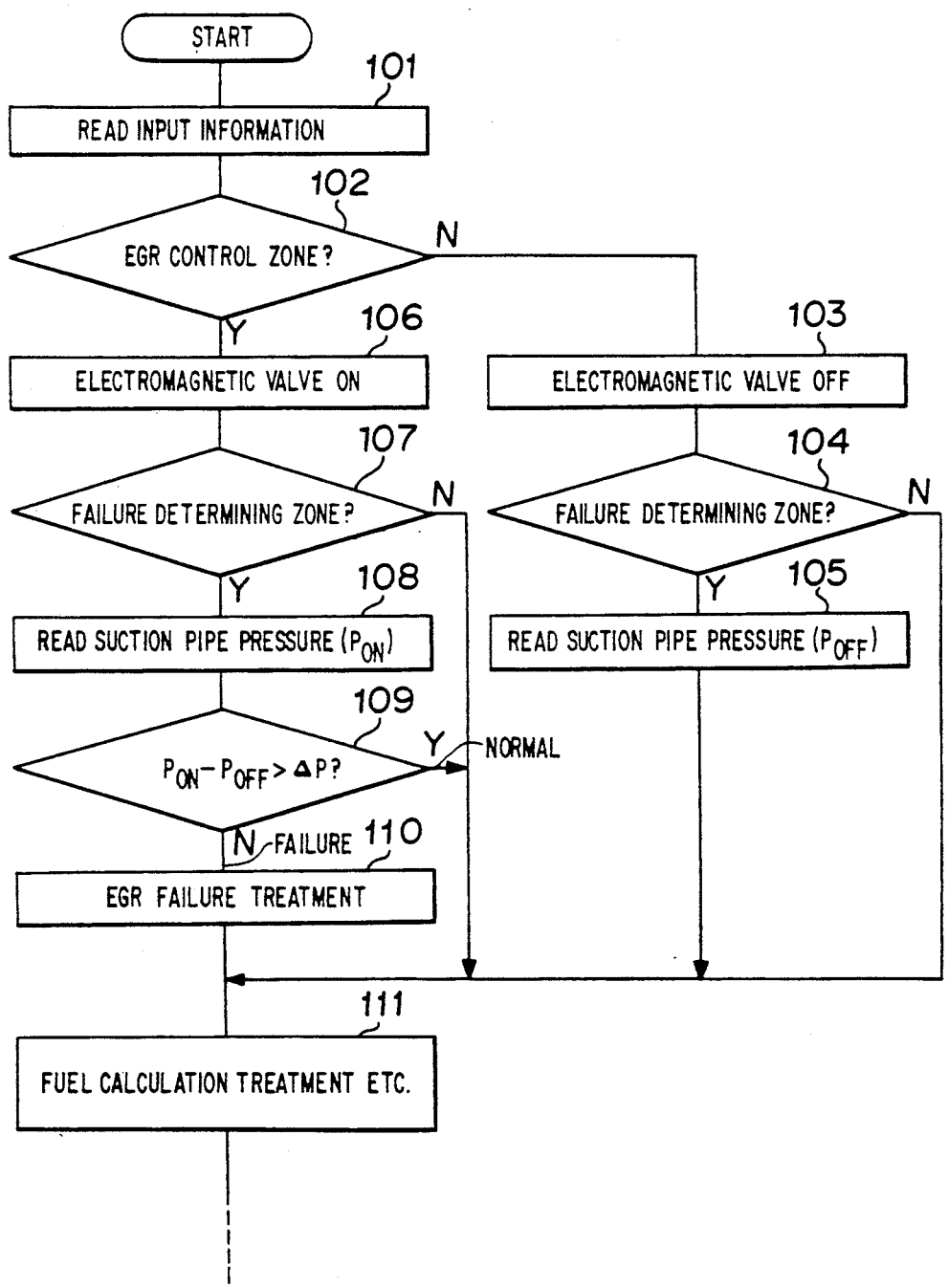
FIG. 2 is a flow chart showing the operation of the apparatus.

Next, explanation will be given to the detailed operations of the electronic engine control device 8 which carries out the major operations of this embodiment, based on the flow chart of FIG. 2. The electronic engine control device 8 is composed of a well known microcomputer, an A/D interface, a ROM, a RAM and so on. The content of the flow chart of FIG. 2 is programed and memorized in the ROM. The program memorized in the ROM is operated by the microcomputer.

First, in Step 101, the control device receives the input information such as a revolution speed of engine, a suction pipe pressure, a throttle opening, a water temperature and so on, from output signals of a crank angle sensor (not shown), the pressure sensor 6, the throttle sensor 7, a cooling water temperature sensor (not shown), and so on. Next, in Step 102, a judgment is made whether the above various information is in the EGR control zone which is memorized and set beforehand in the RAM, or whether the running condition of the engine is in the zone which necessitates EGR. When the information is out of the EGR control zone, the judgment is NO in Step 102. In this case, in Step 103, the electromagnetic valve 9 is off and open which makes the EGR not introduced, and, in Step 104, a judgment is made whether the running condition of the engine falls in a failure determining zone. The failure determining zone is limited to the case of a condition of an engine when the engine runs in steady state as in running on a highway, and when an accelerator pedal is lightly pushed and the opening of the throttle valve 4 is small. The reason is because the variation of the pressure in the suction pipe 3 is considerably varied when the internal combustion engine is not in steady state, and because, when the engine is under heavy load, the pressure difference in the suction pipe 3, between the case where the EGR operates and in the case of non-operation of the EGR is difficult to be determined. In Step 104, when the running condition of the engine does not fall in the failure determining zone, the judgment is NO, and the operation goes to Step 111. When the running condition of the engine falls in the failure determining zone, the judgment is YES, the operation goes to Step 105, and the control device reads the pressure of the suction pipe 3 $P_{OFF}$ which is the pressure when the EGR is not in operation.

On the other hand, in Step 102, when the running condition of an engine falls in the EGR control zone, in Step 106, the electromagnetic valve 9 is on and closed whereby the introduction of the EGR is possible, and in Step 107, a judgment is made whether the running condition of the engine falls in the failure determining zone, the definition of which is the same as explained in Step 104. In Step 107, when the running condition of the engine does not fall in the failure determining zone, the judgment is NO, and the operation goes to Step 111. When the running condition of the engine falls in the failure determining zone, the judgment is YES, and the operation goes to Step 108 wherein the control device reads the pressure of the suction pipe 3 $P_{ON}$ which is the pressure when the EGR is in operation. In Step 109, the difference between the suction pipe pressure when the EGR is in operation and that when the EGR is not in operation, $P_{ON} - P_{OFF}$, both of which are in the failure determining zone, is calculated. When the EGR is in operation, exhaust gas is introduced into the suction pipe 3. Therefore, when the engine runs in the same condition, the pressure of the suction pipe 3 is increased compared with that when the EGR is not in operation and approaches to the atmospheric pressure. Accordingly, when the EGR is in normal operation, the following relationship is established:

$$P_{on} - P_{OFF} > \Delta P$$

where $\Delta P$ is a failure criteria which is experimentally given, and which is below the value of $P_{on} - P_{OFF}$.

In Step 109, when the operation is judged as normal, that is, when the relationship of $P_{on} - P_{OFF} > \Delta P$ is established, the judgment is YES, and the operation goes to Step 111. In Step 109, when the running condition of the engine is determined to fall in the failure determining zone, that is, when the relationship of $P_{on} - P_{OFF} > \Delta P$ is established, the judgment is NO, and the EGR control device is regarded as in a failure state, and the operation goes to Step 110. In Step 110, a failsafe treatment of the EGR, that is, a fail-safe treatment of EGR such as a generation of warning etc., is carried out and the operation goes to Step 111. In Step 111, the other treatments such as a calculation treatment for fuel injection and the control of fuel injection and so on, are carried out.

In this embodiment, explanation is given to the operation for an example wherein the failure determining zone is set as single threshold. However, this failure determining zone can be divided into a plurality of subzones with which the values of the differences of the suction pressures correspond.

As for the fault detection of the EGR control device in this embodiment, explanation is given for the system wherein the suction air quantity of the internal combustion engine is detected by the suction pipe pressure and the fuel injection is carried out according to the detected value. However, this failure detecting system is applicable to another system wherein the suction pipe pressure sensor is added to a detection system in which the suction air quantity is detected by an air-flow sensor.

As explained above, this invention discovers the fact wherein the suction pipe pressure when the EGR control valve is in operation, is higher than that when the EGR control valve is not in operation, and approaches to the atmospheric pressure, and carries out the detection of the failure of the EGR control device by the difference between the suction pipe pressure when the EGR control valve is operated and that when the EGR control valve is not operated. Therefore, in this invention, special parts are not necessary to be added, which enables the detection of the failure at a low expense, and an accurate detection of the failure can be carried out, since the detection of failure is done in the failure determining zone when an internal combustion engine is under light load state and in steady state.

Obviously, numerous modifications and variations of the present invention are possible in light of the above teachings. It is therefore to be understood that within the scope of the appended claims, the invention may be practiced otherwise than as specifically described herein.

What is claimed is:

1. An electronic control apparatus for an internal combustion engine comprising:
   a control device having a control valve operative to control an amount of return of exhaust gas from an exhaust gas passage to a suction gas passage such that when said engine is in a predetermined control zone, said control valve is closed and when said engine is not in said predetermined control zone, said control valve is open;
   a pressure sensor for detecting pressure in a suction gas pipe; and a failure detecting means for passively detecting failure of said control device based on a difference between first and second pressure values in said suction gas pipe, said first pressure value being detected by said pressure sensor when said control valve is open, and said second pressure value being detected by said pressure sensor when said control valve is closed, wherein said first pressure value is stored in memory until said second pressure value is detected at which time said first and second pressure values are compared.

2. The electronic control apparatus for an internal combustion engine according to claim 1, wherein said failure detecting means detects failure of said control device only when said internal combustion engine is under a load below a predetermined value and is running in a steady state.

3. The electronic control apparatus for an internal combustion engine according to claim 1, wherein said failure detecting means detects failure of said control device when said difference between said first and second pressure values is less than a predetermined value.

* * * * *